(12) United States Patent
Haugholt et al.

(10) Patent No.: US 8,199,410 B2
(45) Date of Patent: Jun. 12, 2012

(54) POLYMER LENS

(75) Inventors: Karl H. Haugholt, Oslo (NO); Dag Thorstein Wang, Olso (NO); Frode Tyholdt, Olso (NO); Wilfred E. Booij, Nordby (NO); Ib-Rune Johansen, Olso (NO)

(73) Assignee: poLight AS, Horten (NO)

( * ) Notice: Subject to any disclaimer, the term of this patent is extended or adjusted under 35 U.S.C. 154(b) by 438 days.

(21) Appl. No.: 12/442,323

(22) PCT Filed: Sep. 21, 2007

(86) PCT No.: PCT/NO2007/000332
§ 371 (c)(1),
(2), (4) Date: May 4, 2009

(87) PCT Pub. No.: WO2008/035983
PCT Pub. Date: Mar. 27, 2008

(65) Prior Publication Data
US 2011/0149409 A1    Jun. 23, 2011

(30) Foreign Application Priority Data

Sep. 21, 2006 (NO) .................................. 2006 4271

(51) Int. Cl.
*G02B 1/06* (2006.01)
(52) U.S. Cl. ........................................................ 359/666
(58) Field of Classification Search ........... 359/665–666
See application file for complete search history.

(56) References Cited

U.S. PATENT DOCUMENTS

| 4,783,155 | A | * | 11/1988 | Imataki et al. ............. 359/666 |
| 5,886,332 | A | | 3/1999 | Plesko |
| 6,188,526 | B1 | | 2/2001 | Sasaya et al. |
| 2002/0048096 | A1 | | 4/2002 | Melzer et al. |
| 2002/0149864 | A1 | | 10/2002 | Kaneko |
| 2004/0008419 | A1 | | 1/2004 | Schachar |
| 2005/0036195 | A1 | | 2/2005 | Nishioka |
| 2005/0133789 | A1 | | 6/2005 | Oh et al. |
| 2006/0028734 | A1 | | 2/2006 | Kuiper et al. |
| 2006/0133789 | A1 | | 6/2006 | Yu |
| 2006/0139585 | A1 | | 6/2006 | Van Der Wijst |

(Continued)

FOREIGN PATENT DOCUMENTS

CN          2706779 Y        6/2005

(Continued)

OTHER PUBLICATIONS

Chinese Office Action dated Mar. 18, 2010 for Chinese Application No. 200780034604.6 filed Sep. 21, 2007.

*Primary Examiner* — James Greece
(74) *Attorney, Agent, or Firm* — Knobbe Martens Olson & Bear, LLP (57) ABSTRACT

The invention relates to an optical element having adjustable focal length, and a method for producing an optical element. The optical element comprising a first transparent layer and a transparent soft polymer having a chosen refractive index situated thereon, said layer being made from a material having a chosen flexibility, e.g. a thin glass layer, the optical element also being provided with an actuator for applying a force upon said flexible layer, said force being essentially symmetric relative to said axis thus bending the layer providing a lens surface and providing a curved refractive surface.

10 Claims, 5 Drawing Sheets

U.S. PATENT DOCUMENTS

| | | |
|---|---|---|
| 2007/0211349 A1 | 9/2007 | Chen |
| 2007/0263293 A1 | 11/2007 | Batchko et al. |
| 2007/0299487 A1 | 12/2007 | Shadduck |
| 2008/0277480 A1 | 11/2008 | Thurles et al. |
| 2010/0091389 A1 | 4/2010 | Henriksen et al. |
| 2010/0133230 A1 | 6/2010 | Henriksen et al. |
| 2011/0096411 A1 | 4/2011 | Henriksen et al. |
| 2011/0149408 A1 | 6/2011 | Hahgholt et al. |
| 2011/0164330 A1 | 7/2011 | Henriksen et al. |

FOREIGN PATENT DOCUMENTS

| | | |
|---|---|---|
| DE | 3644225 A1 | 7/1987 |
| GB | 2163864 | 3/1986 |
| JP | 62151824 A | 7/1987 |
| JP | 01140118 | 6/1989 |
| JP | 02178602 | 7/1990 |
| JP | 1062609 A | 3/1998 |
| JP | 1133210 | 5/1999 |
| JP | 200081503 | 3/2000 |
| JP | 2000249813 A | 9/2000 |
| JP | 2001257932 | 9/2001 |
| JP | 2002243918 | 8/2002 |
| JP | 2002239769 | 8/2002 |
| NO | 20064271 | 9/2006 |
| WO | 2004059364 A1 | 7/2004 |
| WO | 2005085930 A1 | 9/2005 |
| WO | WO 2005085930 | 9/2005 |
| WO | WO 2007017089 | 2/2007 |
| WO | WO 2008035984 | 3/2008 |
| WO | WO 2008/044937 | 4/2008 |
| WO | WO 2008/044938 | 4/2008 |
| WO | WO 2008/100154 | 8/2008 |
| WO | WO 2010/005315 | 1/2010 |

* cited by examiner

POLYMER LENS

CROSS REFERENCE TO RELATED APPLICATION(S)

This application is a 35 U.S.C. §371 National Phase Entry Application from PCT/NO2007/000332, filed Sep. 21, 2007, and designating the United States. This application also claims the benefit of Norwegian Patent Application No. 2006 4271 filed Sep. 21, 2006, the disclosure of which is incorporated herein in its entirety by reference.

The present invention relates to a lens with adjustable focal length comprising a first transparent layer and a transparent, flexible material of a soft polymer or similar having a chosen refractive index positioned on a substrate, and methods for producing the lens.

With the recent developments in optical equipment, such as cameras in mobile phones, scanning apparatus and machine vision, there is a demand for small lenses being capable of fast focusing. In mobile phone cameras the number of pixels has been increasing but there is a demand for compact lenses of sufficient quality to use the full advantage of the pixels. This requires focusing capabilities in addition to small size, especially if the camera is also adapted to other purposes, such as reading bar codes and scanning images of objects close to the camera. Adding focusing capabilities to the lens also allows for use of larger apertures, thus increasing the light sensitivity of the system without suffering from the reduced depth of field of the lens.

Conventional glass lenses have been regarded as to large and expensive for many purposes and research has been may to find other solutions. One promising area has been in the development of lenses made from soft polymers. These have some optical properties and may be shaped for focusing action by electrostatic forces, stretching the soft polymer lens or by shaping the soft polymer surface to obtain a chosen shape. Another proposed solution has been to use a soft polymer with a graded refractive index, but this has turned out to be complicated to produce in sufficiently good quality. The problems related to these solutions have been to obtain a sufficiently good lens surface, both in the curvature and the surface continuity.

Other proposed solutions incorporate using a liquid placed in a lens like cavity where the shape of the cavity is adjusted to adjust the focal length of the lens. Examples showing this are discussed in Japanese patent applications, publication Nos JP2002239769, JP2001257932, JP2000081503, JP2000081504 JP10144975 JP11133210, JP10269599 and JP2002243918. In addition this is discussed in a paper by T. Kaneko et al: "Quick Response Dynamic Focusing Lens using Multi-Layered Piezoelectric Bimorph Acutator", Micro-Opto-Mechanicle Systems, Richard R. A. Syms Editor, Proceedings of SPIE, Vol. 4075 (2000). All of these are based on a liquid confined inside a cavity which acts as a lens and where at least one of the surfaces may be shaped by an applied force. This has the disadvantage that the pressure applied to shape the lens has to compress the fluid or the cavity, which requires large forces and may lead to an unwanted response and shape optical surface, or additional chambers have to be provided so as to contain the liquid forced out of the cavity which complicates the production. Volume changes due to temperature fluctuations may also cause problems.

Thus it is an object of this invention to provide a compact focusing lens which may be mass produced and compact equipment such as mobile phones, while providing sufficient optical quality with a large range of distances from the camera. This is obtained as stated in the independent claims.

Note that the term "soft polymer" in this specification is used in a wide sense of the word, and may include a number of different materials, such as silicon and polymer gels.

Using a soft polymer makes it possible to produce lenses where the polymer is in contact with air or other compressible gases, thus requiring much less force when adjusting the focal length of the lens. It also eases the production as the polymer will keep in place even if the different production steps are localized in different positions or facilities. Also, it has a fairly stable shape so that it will keep its position even if placed in tha same cavity as a gas or similar. As mentioned above it also makes it possible to provide leakage channels or bubbles of compressible gas in order to reduce the required force necessary to adjust the lens and to reduce the strains caused by temperature and pressure fluctuations in the environment.

The present invention thus provides an advantageous solution by utilizing the characteristics of a thin flexible membrane and the soft polymers.

The use of polymers thus provides a simplified production of the lens as there is no need to confine the material in a closed cavity. Thus response to changing temperatures and pressures is not problematic and the response to the applied force is predictable.

The invention will be described more in detail below with reference to the accompanying drawings, illustrating the invention by way of examples, wherein: FIGS. 1a-8c illustrates different embodiments of the invention.

As is clear from the drawings, the lens according to the invention may be made from a first cover glass 1 made from a flexible material, e.g. $SiO_2$ or Pyrex, with an optical transparent soft polymer 3 with a known refractive index, e.g. a polymer gel, positioned on the substrate 4 or in a hole in a substrate 2. According to a preferred embodiment of the invention the cover glass 1 is a thin glass plate of the type used in microscopy for holding samples. These glass plates are sufficiently flexible to be formed by an applied pressure, and are sufficiently strong not to break under these conditions and the first optical surface in constituted by the first cover glass, thus representing a formable but fairly hard and durable surface, while the rest of the lens material is constituted by the soft polymer. Preferably the soft polymer and the cover glass have the same refractive index, so at so constitute a single optical surface.

Figure 1A:
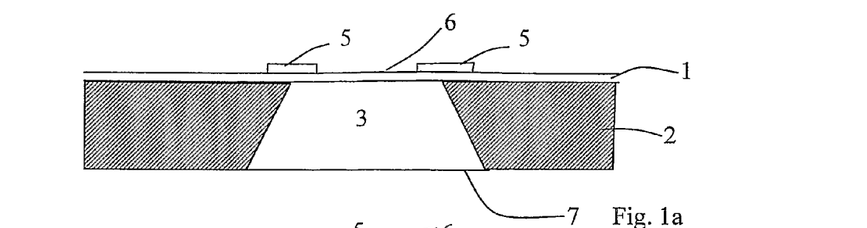
Figure 1B:
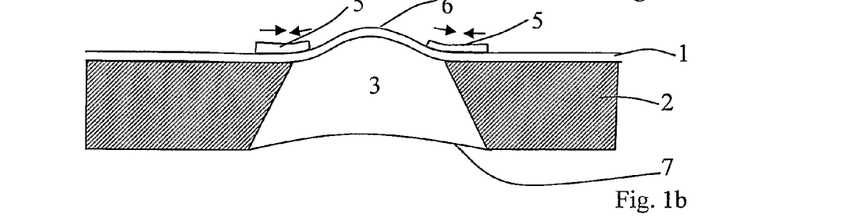

In FIGS. 1a and 1b the soft polymer 3 is positioned in a hole in a substrate 2. This embodiment may be produced by using silicon as a substrate. If one side of the substrate is provided with a transparent layer, e.g. $SiO_2$ or Glass, it may be etched from the opposite side thus producing a recess with an etch stop at the silicon layer. The recess is then filled with a soft polymer 3. The actuator, e.g. a piezoelectric ring, 5 may then be positioned in a per se known way on top cover layer 1 and the recess, where the ring is adapted to contract or expand tangentially when a voltage is applied. The thin top cover layer 1 and the actuator work together as a bimorph actuator. In FIG. 1b the ring 5 is contracted producing a bulge in the cover layer 1. Experiments have shown that the $SiO_2$ layer then provide a curved surface which in the central area constitutes an essential spherical refractive surface 6, thus providing a lens.

In the lower part of FIG. 1b it is illustrated that the lower surface 7 of the soft polymer is moved upward following the soft polymer being drawn upward into the bulge at the cover layer, thus providing a meniscus lens. In FIGS. 1a and 1b the recess has a larger diameter, e.g. resulting from the silicon etching process, and thus the curvature of the lower refracting surface is smaller than the upper refracting surface 6, so that a lens is provided. As mentioned above the experience from other soft polymer lenses with free soft polymer to air interfaces is that the central area of the lower surface will have less curvature than the edges, thus the effect of the curved lower surface 7 is limited. In some situations, if special optical characteristics are required, the shape of the hole could be reversed, having the narrow opening away from the first layer 1.

Figure 2A:
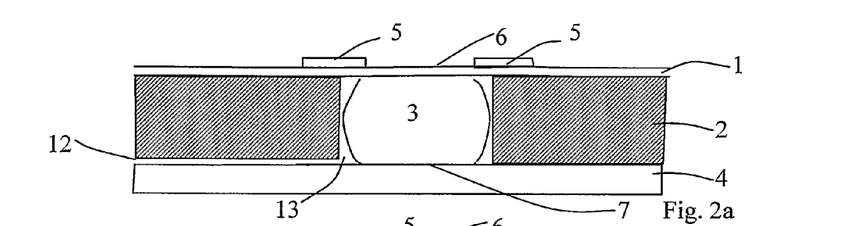
Figure 2B:
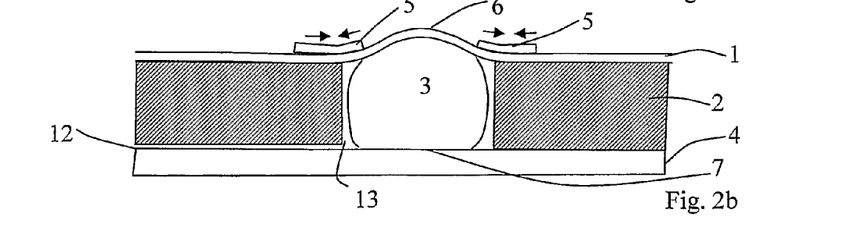

FIGS. 2*a* and 2*b* illustrates essentially the same embodiment as in FIGS. 1*a* and 1*b*, but comprising a second layer 4. Also, the soft polymer 3 is does fill the cavity completely but leaves some space for air or other compressible gas 13. In addition or as an alternative there may also be a leakage channel 12 to the environment so as to equalize pressure changes, e.g. due to temperature variations. As it is important that the polymer is symmetrical in the optically active part the amount of gas in the cavity should be limited so as not to interfere with the optical performance. Thus a small volume of gas in combination with a leakage channel may be advantageous.

In FIG. 2 the lower lens surface 7 is plane, the lens thus providing a planar convex lens. In the embodiment shown in FIGS. 2*a*,2*b* the recess edges are parallel to the optical axis, and may be produced by other etching methods, if the made in silicon, or by drilling.

If the second layer 4 is sufficiently flexible and the soft polymer is sufficiently incompressible it will to a degree follow the movements of the first surface, as FIGS. 1*a*,1*b* provides the extreme example of, the dimensions of the openings may then be chosen to control this effect and the characteristics of the lens. As mentioned above a leakage channel 12 and gas 13 is provided for equalizing the pressure inside and in the environment, and to reduce the required power used to change the lens surface.

Figure 3A:
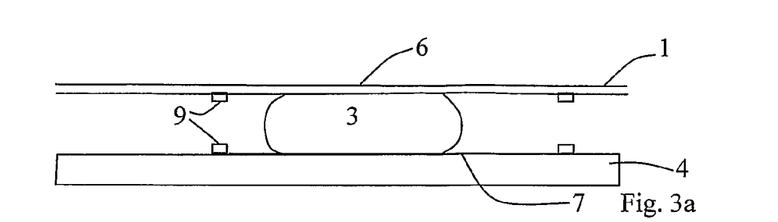
Figure 3B:
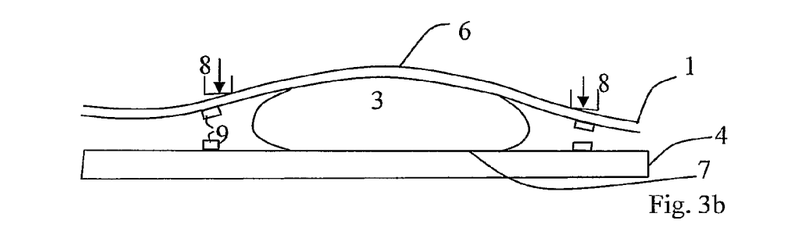

In FIGS. 3*a*,3*b* an alternative embodiment of the invention is illustrated comprising a soft polymer positioned between two transparent layers 1,4, wherein at least one is made from a flexible material, e.g. a thin layer of $SiO_2$ or glass. In the drawings the upper layer 1 is flexible while the lower layer 4 is rigid. The refractive surfaces 6,7 constituting the lens in the illustrated example thus provides a planar convex lens. By chosing the flexibility of the surfaces different curvatures may be obtained at the refractive surfaces.

As is illustrated in FIG. 3*b* the focal length of the lens is adjusted by applying a force to the lens at a chosen distance from the optical axis. This bends the flexible layer 1 or layers 1,4 so that the layers and the soft polymer between them makes a lens having a focal length depending on the applied force.

The force may be applied in several different way, e.g. pushing a coaxial ring 8 toward the flexible surface, this ring may be a piezoelectric device.

Alternatively two ring shaped electrodes 9 may be provided. By applying a voltage between the electrodes 9 the force between them may adjust the curvature of the refracting surfaces 6,7.

Figure 4A:
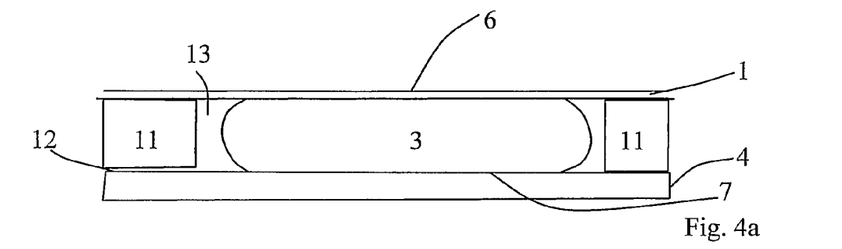
Figure 4B:
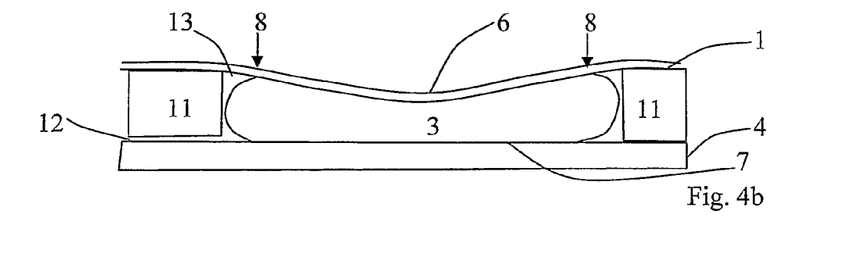

Depending on the intended size and use of the lens spacers 11 may be provided between the transparent layers 1,4 in FIGS. 3*a*,3*b*. As is illustrated in FIGS. 4*a*,4*b* this may be used to provided a concave lens. By applying the force to the first layer 1 outside the spacers 11 the lens will be convex. As in FIG. 2 a leakage channel 12 is also provided.

Figure 5A:
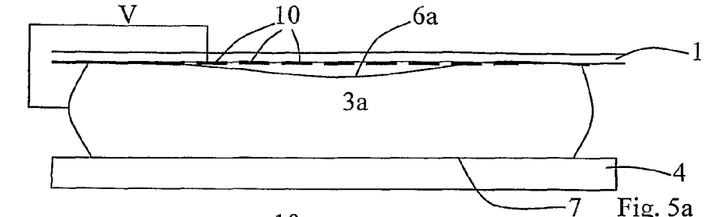
Figure 5B:
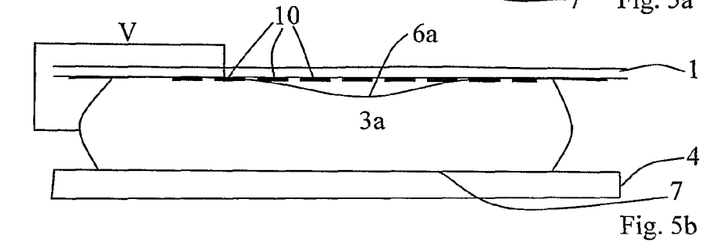

Yet another embodiment is illustrated in FIGS. 5*a*,5*b*, wherein the soft polymer 3*a* is electrically conductive and both the upper and the lower layers 1,4 may be rigid. A bubble is provided between the upper layer 1 and the soft polymer 3*a* so that the refractive, curved surface is constituted by the surface between the soft polymer 3*a* and the bubble. The inner surface of the upper layer 1 is provided with preferably transparent electrodes 10 and a voltage is applied between the soft polymer and the electrodes. By controlling the applied voltage between the soft polymer and the electrodes, as a whole or individually, the soft polymer surface 6*a* may be shaped. In the illustrated case the lens is concave, but depending on the electrodes and how the voltage is applied other solutions may be provided.

Figure 6A:
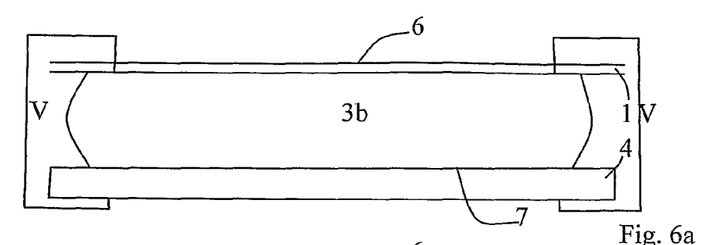
Figure 6B:
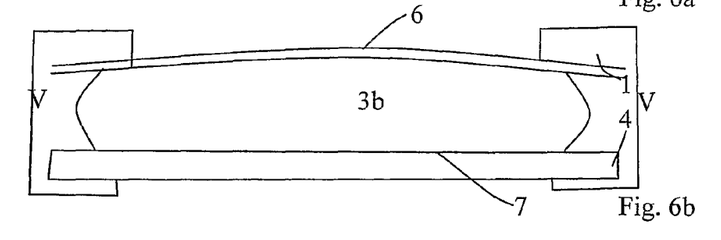

According to a further embodiment illustrated in FIGS. 6*a*,6*b* wherein an electrostrictive soft polymer 3*b* is used a voltage is applied over the circumference of the lens, e.g. by ring shaped electrodes. When the soft polymer reacts to the electrical field close to the electrodes, either by contracting or increasing under the electrical field. If the polymer contracts close electrodes it will force more material toward the centre. This will in turn increase the pressure on the flexible layer 1 and thus provides a curved refractive surface 7. The opposite will also apply if the soft polymer increases its thickness close to the electrodes. In a special version of this embodiment the electrodes may be made from several layers with alternating polarities, positioned so as to increase the electrical field strength through the soft polymer and thus increase the effect. If there is a hole or a thinned area in the middle of the top layer, the soft polymer may be squeezed out in this area, providing a lens.

The lens is then constituted by a glass substrate, a soft polymer, and a flexible plate. By applying a force along a region away from the optical axis the flexible layer is bent over the soft polymer. Experience has shown that the flexible layer 1 especially when constituted by a $SiO_2$ plate thus forms an essentially spherical surface. Thus the lens is comprised by a lens having glass surfaces but containing a soft polymer, and where the glass surface may be formed by adjusting the pressure. Adjusting the pressure may then change the curvature and then the focal length of the lens, thus providing a possibility to change the focus of the lens.

The solution illustrated in FIGS. 1*a*,*b*, and 2*a*,*b* may be made from ordinary Si production methods. The lower surface is a plane substrate, e.g. from glass, and the flexible layer is made from a Silicon wafer wherein a hole is made up to an upper $SiO_2$ or glass surface. The soft polymer is positioned in the hole and is thus squeezed between the substrate (in the case of FIGS. 2*a*,*b*), the silicon disk walls and the upper $SiO_2$ or glass layer. By providing piezoelectric elements or similar on the surface, the curvature of the surface will be modified by the bimorph actuator, and the soft polymer will stick to the surface and follow the movement of the surface. In an alternative embodiment, the dimensions of the hole may be adjusted, and the soft polymer, then needing more or less space, will force the $SiO_2$ layer up or down, thus forming the lens surface.

In all of the solutions discussed above the adjustable refractive surface 6,7 may be made in a reflective material, thus providing an adjustable mirror. In FIG. 2 and onward both the upper and lower layers 1,4 in the drawings may be flexible, so as to provide bi-convex, bi-concave or meniscus lenses.

The optical element according to the invention may thus be coupled to a system for adjusting the focal length of the lens by coupling the actuator providing the force to the lens to standard equipment for providing auto focus to a camera, e.g. in a mobile phone, scanner or bar code reader. The actuator then applies an increasing or decreasing force to the lens so as to adjust the focal length until a signal is given by the system to stop or go backward, e.g. if the required focus has been passed or the adjustment turns out to have the wrong direction.

Figure 7A:
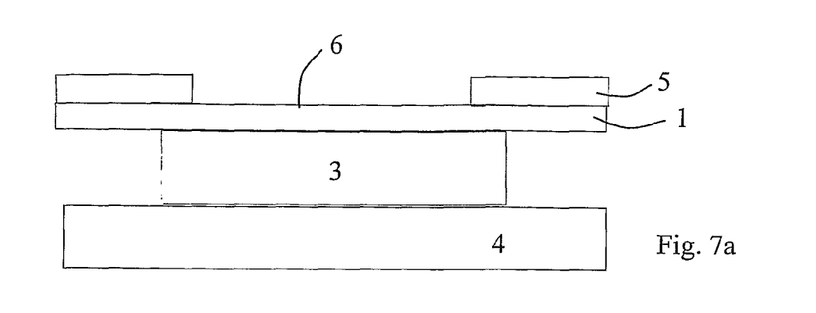
Figure 7B:
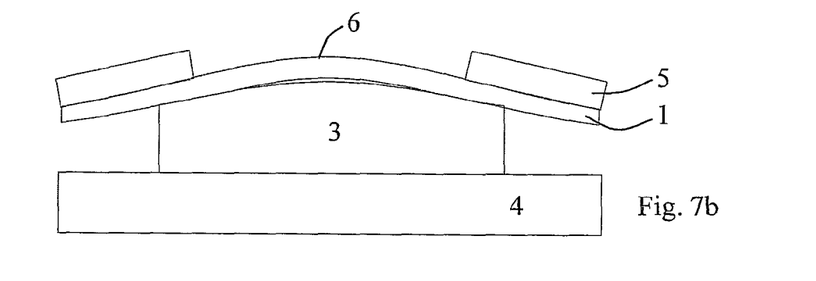
Figure 7C:
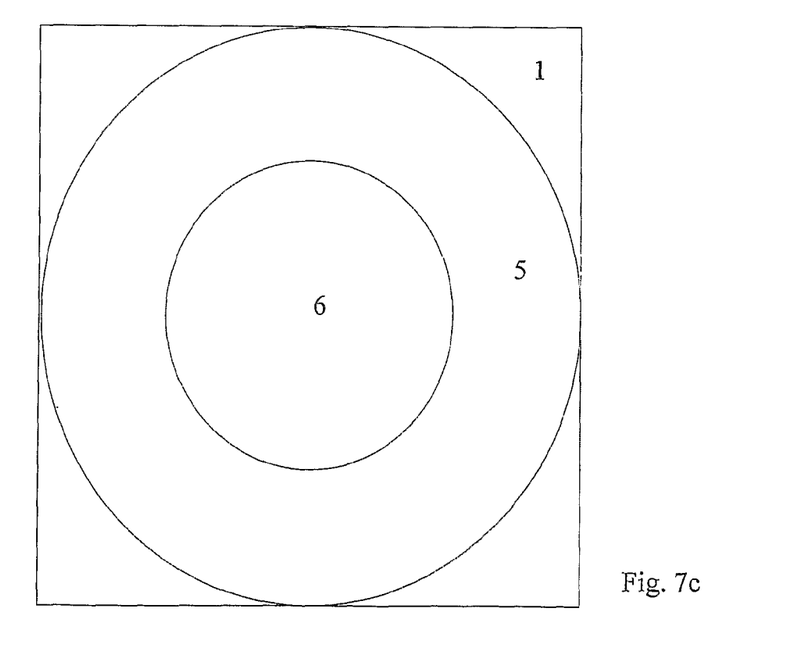

FIGS. 7a,7b,7c illustrates the preferred embodiment of the invention, wherein the actuator, e.g. a piezoelectric or electrostrictive material, is screen printed on the upper layer 1, or deposited and patterned through a per se known lithographic process. The actuator layer 5 shown in FIGS. 7a,7b,7c is ring shaped. According to an alternative embodiment using a transparent actuator, e.g. a polymer film or a PZT film, combined with transparent electrodes, e.g. ITO, the actuator may cover the upper layer completely. The upper layer 1 is made from a thin glass sheet, preferably of Pyrex but sapphire or $SiO_2$ may also be used. The soft polymer like material 3 is preferably made from a conventional gel, but soft polymers or elastomers may also be used, chosen according to the required refractive index. The lower layer 4 is in this case made from glass. The embodiment according to FIGS. 7a,7b, 7c constitutes a solution being easy to produce using standard processes.

Figure 8A:
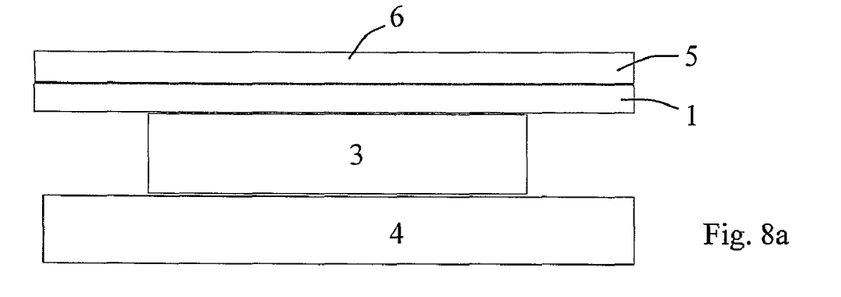
Figure 8B:
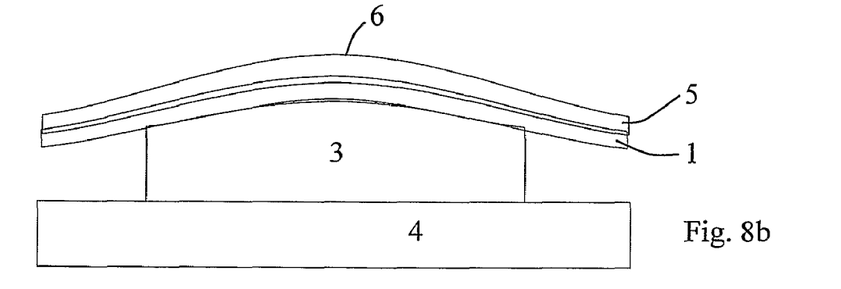
Figure 8C:
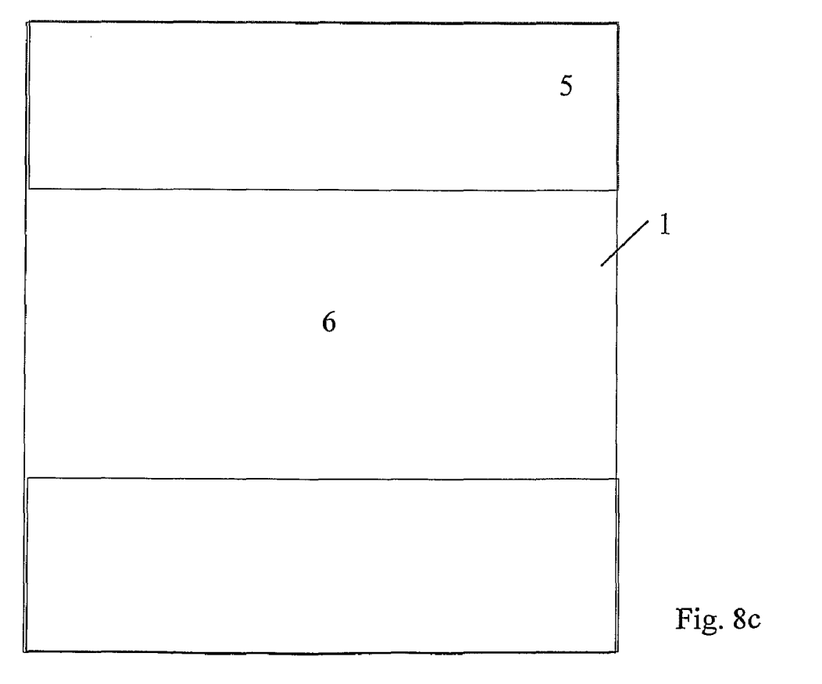

In FIGS. 8a, 8b, 8c an embodiment is illustrated for producing a cylindrical lens. The advantage is that the force required to bend the upper layer in one dimension is much less the force required to produce a dome shaped surface. In order to provide the same characteristics as a conventional lens two cylindrical lenses may be positioned in a series along the optical axis with perpendicular bend directions.

In the description, the actuator have often been referred to as a piezo electric material, but the invention comprises any material that can be used as actuator when subjected to an electric or magnetic field, e.g. materials with strong electrostriction effect, in particular relaxors that display very large strains without hysteresis effects, or magnetostrictive materials. As illustrated in FIGS. 3a-4b the actuator may in some embodiments be any ring shaped element which may be used to apply a force on the lens element.

Power supply and other electronic and/or mechanical device such as driving circuitry, support and housing for the optical element needed for utilizing the invention is not described in detail as they are considered to the obvious to a person skilled in the art, depending on the chosen embodiment and the situation in which it is to be used.

To summarize the invention thus relates to an optical element having adjustable focal length comprising a first transparent layer and a transparent soft polymer, e.g. a gel, having a chosen refractive index situated thereon, said layer being made from a material having a chosen flexibility, e.g. a thin glass layer, the optical element also being provided with an actuator for applying a force upon said flexible layer, said force being essentially planar or circular symmetric relative to said axis thus bending the polymer surface close to the upper layer providing a lens surface and providing a curved refractive surface.

The optical element may also comprise a second transparent layer positioned on the opposite side of the soft polymer and essentially covering said soft polymer so as to provide a second refractive surface 7 close to the second layer with a predetermined shape. Alternatively the second transparent layer may also be flexible and provided with an actuator for shaping the second refractive surface. If one of the layers has an opening the polymer innside it may be squeezed out of or retracted into the polymer chamber the surface may provide a lens shaped refractive surface, but, as stated above, the optical quality of this surface may be limited.

The first transparent layer may be constituted by $SiO_2$ and the optical element further comprises an Si substrate having an opening, said soft polymer being situated in said opening.

The upper and possibly lower transparent layers may compris force actuators adapted to apply a circularly symmetrical force to said first layer, thus providing an essentially spherically shaped first layer close to the centre, the centre thus defining an optical axis for the lens element surface 6,7. The actuator or actuators may be constituted by ring shaped piezoelectric actuator adapted to apply a force on said first layer.

Alternatively the force actuator may be mounted in a housing and be arranged symmetrically relative a chosen optical axis and adapted to apply a force being parallel to the optical axis. This may be provided using a ring being forced against at least one of the layers 1,4 to bend the layers, the force may be applied mechanically or with magnets, piezoelectric elements or electral actuators.

According to a different embodiment of the invention an essentially circular bubble is provided between said first and/or second layer and said soft polymer at a chosen optical axis, said soft polymer being electrically conductive, and said first layer being provided with a ring shaped pattern of electrical conductors symmetrically relative to said chosen optical axis, and said actuator being constituted by a voltage source coupled to said electrodes and to said soft polymer, thus providing a force between a chosen electrode on said first layer and said soft polymer shaping the soft polymer surface relative to said electrodes.

According to another embodiment of the invention the second layer is placed on the opposite side of the soft polymer from said first layer, and the soft polymer is electrostrictive. The actuator is constituted by at least one circular electrode provided on each layer and voltage providing means applying a voltage between the electrodes, the soft polymer thus reacting to the voltage and expanding or contracting as a result of said voltage. This way the reactions of the polymer to the electrical field results in the curved refractive surfaces.

As is described above the actuator is adapted to provide a circularly symmetric force relative to the optical axis, thus providing an essentially spherically shaped bend on said first transparent layer close to the centre. It is, however, possible to let the actuator be adapted to provide a planar symmetric force relative to a plane including the optical axis, thus providing a cylindrically shaped bend on said first transparent layer, where the cylindrical bend has an axis perpendicular to the optical axis. By combining two such lenses along an optical axis a result similar to one traditional lens may be achieved, but requiring less force applied by the actuators.

The lens according to the invention may be produced in several ways. The lens illustrated in FIGS. 1a-2b may be made using e method comprising the steps of providing a silicon plate having a $SiO_2$ or glass layer on one side, etching an opening into said silicon plate, and positioning a soft polymer into said opening, the soft polymer thus having contact with the $SiO_2$ or glass layer, and positioning a force actuator on said $SiO_2$ or glass layer. A second layer may then be provided on the opposite side of said silicon plate, the soft polymer thus being enclosed in a cavity. The actuator is a piezoelectric or electrostrictive ring said ring being positioned coaxially with the chosen optical axis and being adapted to provide a radial force to the $SiO_2$ layer thus making a bulge or dome in said first layer and said soft polymer.

Alternatively the lens may be made by the step of depositing the actuator on the glass surface, e.g. by a printing method, thinning the glass by e.g. etching or grinding from the opposite side of said glass surface, and providing the soft polymer on the opposite side of the thin glass plate.

The invention claimed is:

1. An optical element having adjustable focal length and an optical axis, comprising: a first transparent layer having a perpendicular orientation relative the optical axis and being situated upon a transparent soft polymer having a predetermined refractive index; and a second transparent layer positioned on an opposite side of said soft polymer, wherein said first transparent layer is made from a hard material having a predetermined flexibility comprising a thin glass layer, and the flexible first transparent layer is provided with an actuator for applying a force upon said first transparent layer at a distance from said optical axis, said force being essentially symmetric relative to said optical axis thus bending the first transparent layer to form a lens surface and a curved refractive surface, the focal length of the optical element thus being dependent on a curvature of the curved refractive surface, and wherein the soft polymer includes at least one surface contact with a compressible gas, said at least one surface being outside the optical axis.

2. The optical element according to claim 1, wherein the first transparent layer is a constituted by SiO.sub.2 and the assembly further comprises an Si substrate having an opening, said soft polymer being situated in said opening.

3. The optical element according to claim 1, wherein said force actuator is adapted to apply a circularly symmetrical force to said first transparent layer, said force being oriented coaxially with said optical axis, thus providing an essentially spherically shaped first layer close to the centre.

4. The optical element according to claim 3, wherein the force actuator is constituted by ring shaped piezoelectric or electrostrictive actuator applied on the surface of said first transparent layer and adapted to apply a force on said first transparent layer.

5. The optical element according to claim 3, wherein the force actuator is a coaxial ring shaped actuator mounted in a housing containing said optical element, arranged symmetrically relative to a chosen optical axis, and adapted to apply a force in a direction that is parallel to the optical axis.

6. The optical element according to claim 1, wherein said soft polymer is electrostrictive and said actuator is constituted by at least one circular electrode provided on each layer and voltage providing means applying a voltage between the electrodes, the soft polymer thus reacting to the voltage and expanding or contracting as a result of said voltage.

7. The optical element according to claim 1, wherein the actuator is adapted to provide a planar symmetric force relative to a plane including the optical axis, thus providing a cylindrically shaped bend on said first transparent layer.

8. The optical element according to claim 1 wherein the said soft polymer is a gel.

9. The optical element according to claim 1 wherein the soft polymer is confined in a cavity, said cavity having a leakage channel to the environment.

10. The optical element according to claim 1 wherein the said compressible gas constitutes a space surrounding said soft polymer and being essentially symmetrical relative to said axis.

* * * * *

UNITED STATES PATENT AND TRADEMARK OFFICE
CERTIFICATE OF CORRECTION

PATENT NO. : 8,199,410 B2  
APPLICATION NO. : 12/442323  
DATED : June 12, 2012  
INVENTOR(S) : Karl H. Haugholt et al.

It is certified that error appears in the above-identified patent and that said Letters Patent is hereby corrected as shown below:

In the Specifications:

In Column 1, Line 49, please delete "JP2000081504   JP10144975" and insert therefore, --JP2000081504, JP10144975,--.

In Column 1, Line 52, please delete "Acutator"," and insert therefore, --Actuator",--.

In Column 1, Line 53, please delete "Mechanicle" and insert therefore, --Mechanical--.

In Column 2, Line 13, please delete "tha" and insert therefore, --the--.

In Column 3, Line 44, please delete "chosing" and insert therefore, --choosing--.

In Column 4, Lines 51-52, please delete "alternative" and insert therefore, --alterative--.

In Column 5, Line 29, please delete "piezo electric" and insert therefore, --piezoelectric--.

In Column 5, Line 61, please delete "innside" and insert therefore, --inside--.

In Column 6, Lines 1-2, please delete "compris" and insert therefore, --comprise--.

In Column 6, Line 15, please delete "electral" and insert therefore, --electrical--.

Signed and Sealed this  
Fourth Day of June, 2013

Teresa Stanek Rea  
*Acting Director of the United States Patent and Trademark Office*